US007815281B2

(12) United States Patent
Hays et al.

(10) Patent No.: US 7,815,281 B2
(45) Date of Patent: Oct. 19, 2010

(54) PRINT ELEMENT DE-PRIME METHOD

(75) Inventors: Andrew W Hays, Fairport, NY (US); James C Diehl, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 696 days.

(21) Appl. No.: 11/851,805

(22) Filed: Sep. 7, 2007

(65) Prior Publication Data

US 2009/0066747 A1 Mar. 12, 2009

(51) Int. Cl.

| | |
|---|---|
| ***B41J 2/165*** | (2006.01) |
| ***B41J 29/38*** | (2006.01) |
| ***B41J 2/195*** | (2006.01) |
| ***B41J 2/175*** | (2006.01) |
| ***B41J 2/19*** | (2006.01) |
| ***G01D 11/00*** | (2006.01) |

(52) U.S. Cl. .................. 347/23; 347/6; 347/7; 347/88; 347/92; 347/99

(58) Field of Classification Search .................. 347/23, 347/6, 7

See application file for complete search history.

(56) References Cited

U.S. PATENT DOCUMENTS 6,318,841 B1 11/2001 Coleman et al.
6,334,658 B1 * 1/2002 Suzuki .......................... 347/7
6,357,865 B1 3/2002 Kubby et al.
6,367,915 B1 4/2002 Gooray et al.
6,398,337 B1 6/2002 Wyble et al.
6,419,335 B1 7/2002 Gooray et al.
6,742,862 B2 6/2004 Yamada et al.

* cited by examiner

*Primary Examiner*—Uyen-Chau N Le
*Assistant Examiner*—Kajli Prince
(74) *Attorney, Agent, or Firm*—Gibb I.P. Law Firm, LLC

(57) ABSTRACT

An image forming device comprises an ink reservoir that contains a reservoir ink. The ink reservoir is arranged to provide the reservoir ink to an included print element by means of an included ink supply channel. A print element ink thus is supplied to the print element. When a fault condition is detected that indicates a likelihood of a freezing of the print element ink, the print element is de-primed by forcing the print element ink to evacuate, discharge, withdraw or flow from the print element by means of the ink supply channel. The fault condition comprises any of a loss of power, a power-down process or a print element temperature being less than or equal to a threshold value.

20 Claims, 1 Drawing Sheet

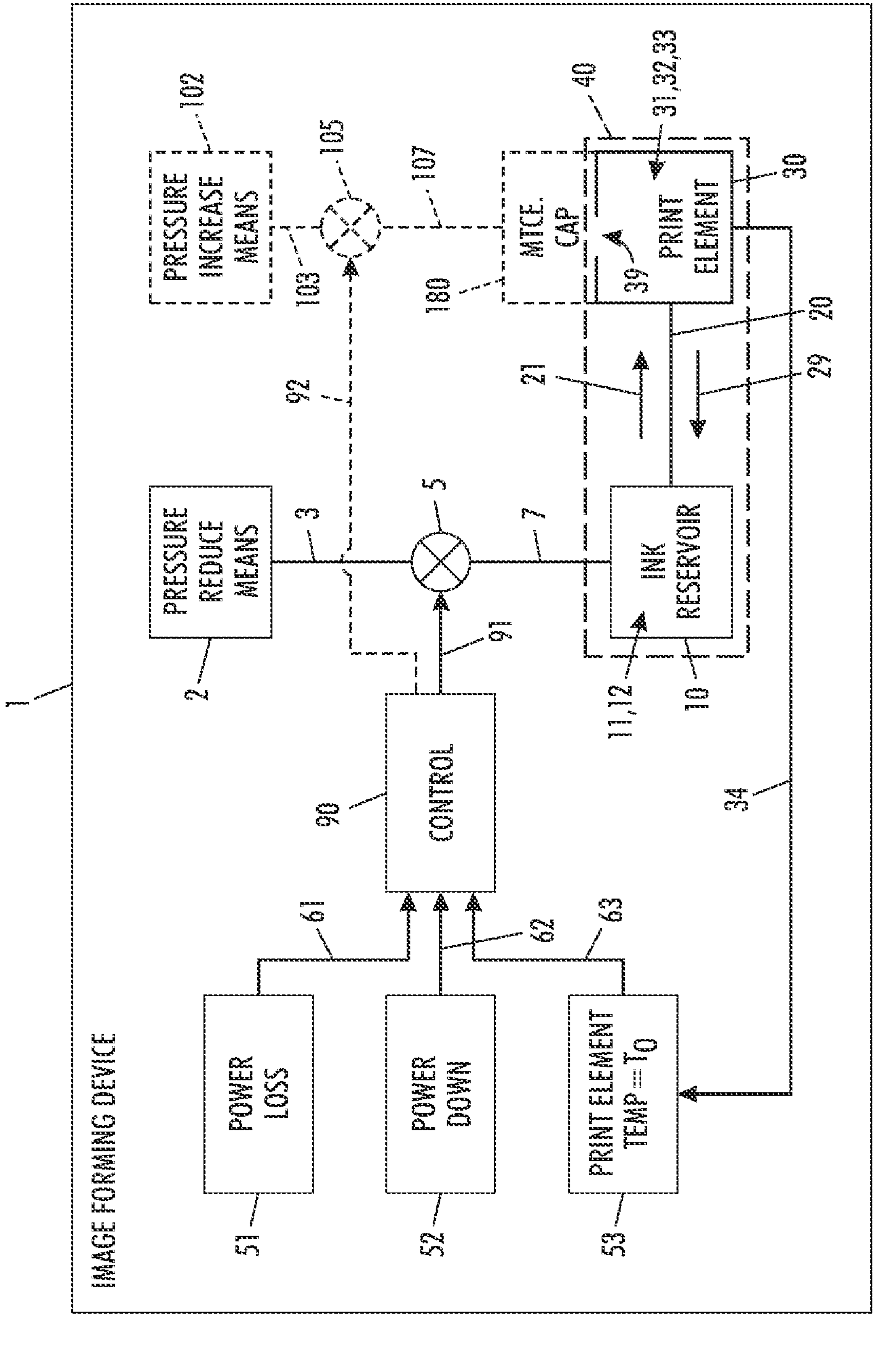
IMAGE FORMING DEVICE
1
PRESSURE REDUCE MEANS
2
3
5
7
PRESSURE INCREASE MEANS
102
103
105
107
92
91
MTCE. CAP
180
PRINT ELEMENT
30
31,32,33
39
40
20
21
29
INK RESERVOIR
10
11,12
34
CONTROL
90
61
62
63
POWER LOSS
51
POWER DOWN
52
PRINT ELEMENT TEMP = $T_O$
53

PRINT ELEMENT DE-PRIME METHOD

INCORPORATION BY REFERENCE OF OTHER PATENTS

The disclosures of the following six (6) U.S. Patents in their entirety hereby are totally incorporated herein by reference:

U.S. Pat. No. 6,742,862 B2, issued to Noriyuki Yamada et al., granted 1 Jun. 2004, entitled "Print head purging unit that selects nozzle row to be purged using rotating member";

U.S. Pat. No. 6,419,335 B1, issued to Arthur M. Gooray et al., granted 16 Jun. 2002, entitled "Electronic drive systems and methods";

U.S. Pat. No. 6,398,337 B1, issued to Thomas J. Wyble et al., granted 4 Jun. 2002, entitled "Ink jet printhead scrubbing and priming apparatus and method";

U.S. Pat. No. 6,367,915 B1, issued to Arthur M. Gooray et al., granted 9 Apr. 2002, entitled "Micromachined fluid ejector or system and methods";

U.S. Pat. No. 6,357,865 B1, issued to Joel A. Kubby et al., granted 19 Mar. 2002, entitled "Micro-electro-mechanical fluid ejector and method of operating same"; and U.S. Pat. No. 6,318,841 B1, issued to Charles P. Coleman et al., granted 20 Nov. 2001, entitled "Fluid drop ejector".

BACKGROUND OF THE INVENTION

Solid ink shrinks by about 17% by volume when it freezes. If the flexible, drop ejecting membranes in a MEMSJet printhead are in intimate contact with the ink as it freezes they can be deformed to the point of breaking due to this shrinkage.

Note, the term "MEMS" refers to "Micro Electromechanical System". Hence, the term "MEMSJet printhead" generally refers to a Micro Electromechanical System ink drop ejector marking devices. A general discussion of such devices may be found in U.S. Pat. No. 6,357,865, "Micro-electro-mechanical fluid ejector and method of operating same", issued 19 Mar. 2002 to Joel A. Kubby et al., especially the text appearing from col. 1, line 5 to col. 2, line 32.

Likewise, damage can be incurred during the thawing phase due to a buildup of pressure. Once broken, the membrane can no longer be used to eject drops and worse, ink gets under the membrane and into the rest of the vent system ruining the printhead. The thawing process can also cause enough pressure buildup to delaminate the nozzle plate from the actuator walls thereby destroying the head. The combination of solid ink and membrane based MEMS direct marking devices is new and the problem has not been encountered before.

Thus, there is a need for the present invention.

SUMMARY OF THE INVENTION

In a first aspect of the invention, there is provided a method to deprime a print element in an image forming device, the image forming device comprising an ink reservoir that contains a reservoir ink, and where the ink reservoir is arranged to provide the reservoir ink to the print element by means of an included ink supply channel such that a print element ink is supplied to the print element, the method comprising (a) detecting a fault condition that is based on a likelihood of a freezing of the print element ink; and (b) when the fault condition is detected, causing the print element ink to flow from the print element by means of the ink supply channel.

BRIEF DESCRIPTION OF THE DRAWING

The drawing depicts an image forming device 1 comprising an ink reservoir 10, a print element 30 and an ink supply channel 20 coupled therebetween. The ink reservoir 10 contains a depicted reservoir ink 11. The ink reservoir 10 and ink supply channel 20, in turn, are arranged to supply 21 the reservoir ink 11 to the print element 30, thus forming a depicted print element ink 31 that is comprised in the print element 30.

DETAILED DESCRIPTION OF THE INVENTION

Briefly, in accordance with the present invention, an image forming device 1 comprises an ink reservoir 10 that contains a reservoir ink 11. The ink reservoir 10 is arranged to provide the reservoir ink 11 to an included print element 30 by means of an included ink supply channel 20. A print element ink 31 thus is supplied to the print element 30. When a fault condition is detected that indicates a likelihood of a freezing of the print element ink 31, the print element 30 is de-primed by forcing the print element ink 31 to evacuate, discharge, withdraw or flow from the print element 30 by means of the ink supply channel 20. The fault condition comprises any of a loss of power, a power-down process or a print element temperature 33 being less than or equal to a threshold value.

Referring now to the drawing, there is depicted apparatus that is useful to demonstrate a first embodiment of a print element de-prime method, in accordance with the present invention. There is shown an image forming device 1 comprising an ink reservoir 10, a print element 30 and an ink supply channel 20 coupled therebetween. The ink reservoir 10 contains a reservoir ink 11. The ink reservoir 10 and ink supply channel 20, in turn, are arranged to supply ink to the print element 30, thus forming a print element ink 31 in the print element 30.

There is also depicted a printhead 40 that comprises the ink reservoir 10, the ink supply channel 20 and the print element 30.

Still referring to the drawing, in various embodiments the present print element 30 is similar to the print element depicted by reference number 100 in the drawing views labeled FIGS. 1, 3, 4 and 7 of the aforementioned U.S. Pat. No. 6,419,335 issued 16 Jul. 2002 to Arthur M. Gooray et al., the full, absolute and complete disclosure of which U.S. Pat. No. 6,419,335 herein is incorporated by reference verbatim, and with the same effect as though such disclosure were hereinat presented and reproduced in its entirety.

Still referring to the drawing, in various embodiments the present print element 30 is similar to the print elements depicted by reference numbers 100, 200, 300, 400 and 500 in the drawing views labeled FIGS. 1, 2, 3, 4 and 5 of the aforementioned U.S. Pat. No. 6,367,915 issued 9 Apr. 2002 to Arthur M. Gooray et al., the full, absolute and complete disclosure of which U.S. Pat. No. 6,367,915 herein is incorporated by reference verbatim, and with the same effect as though such disclosure were hereinat presented and reproduced in its entirety.

Still referring to the drawing, in various embodiments the present print element 30 is similar to the print element depicted by reference number 100 in the drawing views labeled FIGS. 4, 5 and 6 of the aforementioned U.S. Pat. No. 6,357,865 issued 19 Mar. 2002 to Joel A. Kubby et al., the full, absolute and complete disclosure of which U.S. Pat. No. 6,357,865 herein is incorporated by reference verbatim, and with the same effect as though such disclosure were hereinat presented and reproduced in its entirety.

Still referring to the drawing, in various embodiments the present print element 30 is similar to the print elements depicted by reference numbers 100, 200 and 300 in the drawing views labeled FIGS. 1, 2, 3, 4, 5 and 6 of the aforementioned U.S. Pat. No. 6,318,841 issued 20 Nov. 2001 to Charles P. Coleman et al., the full, absolute and complete disclosure of which U.S. Pat. No. 6,318,841 herein is incorporated by reference verbatim, and with the same effect as though such disclosure were hereinat presented and reproduced in its entirety.

As shown, the ink reservoir 10 includes a reservoir pressure 12.

Also as shown, the print element 30 includes print element pressure 32, a print element temperature 33 and a print element nozzle 39.

In accordance with a first embodiment of a method to deprime a print element 30, in accordance with the present invention, the depicted power loss detector 51, the power down detector 52 and the print element temperature detector 53 are arranged to detect at least one fault condition that is based on a likelihood of a freezing of the print element ink 31.

The power loss detector 51 is arranged to detect a first fault condition comprising a loss of power. Upon detecting a loss of power, the detector 51 signals the depicted control means 90 by means of the depicted corresponding power loss detector output 61.

The power down detector 52 is arranged to detect a second fault condition comprising a power-down process. Upon detecting a power-down process, the detector 52 signals the control means 90 by means of the depicted corresponding power down detector output 62.

As shown, the print element temperature 33 is provided to the print element temperature detector 53 by means of the depicted print element temperature signal 34.

The third detector 53 is arranged to cooperate with the print element temperature signal 34 to detect a third fault condition comprising the print element temperature 33 being less than or equal to a threshold value ($T_0$). Upon detecting that the print element temperature 33 is less than or equal to the threshold value, the detector 53 signals the control means 90 by means of the depicted corresponding print element temperature detector output 63.

As described in greater detail below, in accordance with a print element de-prime method, in accordance with the present invention, when at least one fault condition is detected by any of the detectors 51, 52, 53, the control means 90 is signaled by means of the respective detector outputs 61, 62, 63. The control means 90, in turn, thereupon acts to cause the print element ink 31 to evacuate, discharge, withdraw or flow from the print element 30 by means of the ink supply channel 20.

Moreover, the print element ink 31's act of evacuating, discharging, withdrawing or flowing from the print element 30 is generally depicted in the drawing by the reference number 29.

In a first embodiment of a print element de-prime method, in accordance with the present invention, the method includes reducing the reservoir pressure 12, thereby causing the print element ink 31 to evacuate, discharge, withdraw or flow from the print element 30, generally as depicted by reference number 29.

As shown, the control means 90 is arranged to activate the depicted pressure reducing means valve 5 by means of the depicted control means pressure reducing means valve output 91. By activating the pressure reducing means valve 5, the depicted pressure reducing means 2 is thereby coupled to the ink reservoir 10 by means of the depicted pressure reducing means channel 3 and the depicted pressure reducing means ink reservoir channel 7.

In various embodiments, the pressure reducing means 2 comprises a negative pressure atmosphere or vacuum source that is maintained in a provided storage means or vessel.

In various embodiments, the pressure reducing means 2 comprises an atmosphere suction or expansion pump.

In a second embodiment of a print element de-prime method, in accordance with the present invention, the method includes increasing the print element pressure 32, thereby causing the print element ink 31 to evacuate, discharge, withdraw or flow from the print element 30, generally as depicted by reference number 29.

As shown, the control means 90 is arranged to activate the depicted pressure increasing means valve 105 by means of the depicted control means pressure increasing means valve output 92. By activating the pressure increasing means valve 105, the depicted pressure increasing means 102 is thereby coupled to the print element 30 by means of the depicted pressure increasing means channel 103 and the depicted pressure increasing means print element channel 107.

In various embodiments, the method includes bringing the print element nozzle 39 into contact with the depicted maintenance cap 180 and with the maintenance cap, in turn, being coupled to the pressure increasing means 102.

Referring to the present maintenance cap 180, in various embodiments the maintenance cap 180 is similar to the maintenance caps depicted by reference numbers 9*a* and 9*b* in the drawing view labeled FIG. 1 of the aforementioned U.S. Pat. No. 6,742,862 issued 1 Jun. 2004 to Noriyuki Yamada et al., the full, absolute and complete disclosure of which U.S. Pat. No. 6,742,862 herein is incorporated by reference verbatim, and with the same effect as though such disclosure were hereinat presented and reproduced in its entirety.

Still referring to the present maintenance cap 180, in various embodiments the maintenance cap 180 is similar to the maintenance cap depicted by reference number 52 in the drawing views labeled FIGS. 2 and 3 of the aforementioned U.S. Pat. No. 6,398,337 issued 4 Jun. 2002 to Thomas J. Wyble et al., the full, absolute and complete disclosure of which U.S. Pat. No. 6,398,337 herein is incorporated by reference verbatim, and with the same effect as though such disclosure were hereinat presented and reproduced in its entirety.

Still referring to the present maintenance cap 180, similar to the aforementioned U.S. Pat. No. 6,742,862 to Noriyuki Yamada et al., especially the patent text at col. 6, lines 19-22 in the same U.S. Pat. No. 6,742,862, although not shown in the present drawing, the present image forming device 1 includes a configuration for bringing the present maintenance cap 180 into and out of intimate contact with the present print element 30.

In various embodiments, the pressure increasing means 102 comprises a positive pressure atmosphere source that is maintained in a provided storage means or vessel.

In various embodiments, the pressure increasing means 102 comprises a provided atmosphere blower or compressor pump.

In a third embodiment of a print element de-prime method, in accordance with the present invention, the method includes a first act of reducing the reservoir pressure 12 by various methods that are described hereinabove and a second act of increasing the print element pressure 32 by various methods that are described hereinabove, thereby causing the print element ink 31 to evacuate, discharge, withdraw or flow from the print element 30, generally as depicted by reference number 29.

In summary, in accordance with the present invention, when the printhead is de-primed before it is allowed to freeze, then the probability of breaking membranes during the freeze/thaw cycle is considerably lower. The de-priming process is necessary not only during a normal printer shutdown but also during a power fault, i.e. when there is no wall outlet power available to the printer. The present invention provides a number of different ways of de-priming the printhead in the absence of power. De-priming is achieved by creating a pressure differential between atmosphere and the printhead ink cavity across the nozzles. This pressure differential is created by storing vacuum or pressure and applying it to the printhead in a zero power condition or by using an auxiliary power source such as a battery to energize a pump and any control mechanisms needed.

Broken membranes in a MEMSJet head are catastrophic because not only does the broken actuator represent a missing jet but ink then contaminates the entire venting system and degrades the performance of the head by getting under other membranes. It has recently been observed that the performance of MEMSJet printheads degrades due to broken membranes after the system undergoes a freeze/thaw cycle. The present invention effectively addresses this problem.

When solid ink freezes it undergoes a significant volume change, typically in the 15-20% range. If the volume change is, say, 17% then we would expect that any given dimension would shrink by approximately 6%. This is not strictly true but is a good place to start for a "back of the envelope" calculation. In the current MEMSJet devices the height of the SU8 walls between actuators is 80 microns. Thus, the ink will shrink about 5 microns in a direction normal to the nozzle plate plane. This is an order of magnitude larger than the membrane normally moves during normal operation and it is easy to see where a deflection on the order of microns could cause the 2 um thick membrane to crack. The mental model for this failure mechanism incorporates an assumption of adhesion between the frozen ink and the membrane surface. If there is no adhesion then the maximum pressure differential across the membrane as the ink pulls it up will be one atmosphere which is unlikely to cause damage to the membrane. However, adhesion forces could contribute additional strain force on the membrane causing it to crack.

In addition to the damaging effects hypothesized for the freezing process, damage may also be induced during the thawing process. Depending on what the ink distribution was at the time of freezing and how it thaws, one can easily create a catastrophic situation. Imagine that the ink in an actuator freezes in such a way that, although the macroscopic mass of ink in the printhead and ink delivery system is shrinking by 17%, within a particular actuator there is 100% fill of the volume. This could easily happen if there is a temperature gradient across the printhead and ink system so that as the ink freezes from the nozzle first, molten ink is able to be drawn in from the ink supply system to compensate for the volume reduction.

Now when the printhead and ink supply system are reheated, if the printhead ink melts before the ink supply system ink, there can be no relief of pressure backwards in the system. It is likely that the printhead nozzles will also be frozen as the nozzle plate is unheated and one of the coldest parts of the printhead. Therefore, there is no pressure relief in this direction as well. The only thing that can yield is the membrane and it is possible to imagine that with enough pressure/volume change it will eventually crack.

It has been observed experimentally that freeze/thaw cycles cause cracking and breaking of the membranes.

The following is an overview of the present invention. De-priming the printhead before the ink freezes relieves the head of any of these stress inducing mechanisms because of a couple of factors. First, the volume of ink left in the actuator is greatly reduced so that the total ink volume change is less. Second, air is introduced into the actuator chamber so that there is another compliant entity in addition to the membrane that can absorb the volume change.

Intentionally de-priming the printhead before it freezes does not create an additional priming step when the printer is brought on line again because the head needs to be primed anyway after a freeze/thaw cycle. This is because air is exsolved from the ink as it freezes and bubbles precipitate out. These bubbles need to be actively removed from the system in order for printing to occur reliably. Actively de-priming the printhead and ink delivery system may actually make the system easier to re-prime as it is only one big "air bubble" that needs to be primed out versus a large number of small, randomly positioned bubbles. In any case, priming will ideally use very little ink to remove air bubbles from the system. For the current MEMSJet design bubble-free priming is very easy to achieve and generates extremely little waste ink in contrast to current piezo based designs.

The de-prime process needs to be implemented any time the printhead freezes otherwise there is a risk of broken membranes. There are two situations when this occurs. One is when the printer is powered off and goes through a shutdown routine. The machine still has logic capabilities and can function electromechanically so a controller based process flow can be implemented. The second case is much trickier. For the situation where power is lost to the printhead due to a power outage or pulled plug there is no logic and any electromechanical systems that rely on an AC power source (or DC power supplies that use AC power) will no longer function. The de-prime function still needs to function anyway as failure to de-prime will result in the destruction of an expensive printhead.

The following text describes various embodiments of the present invention. The concepts are described within the context of the Jupiter ink delivery system which has an ink reservoir connected to the printhead via a heated umbilical. The reservoir can be pressurized to deliver ink to the printhead through an air tube which during normal printing operation is open to atmosphere. The previous generation ink delivery system consisted of melting ink sticks above an open ink reservoir attached directly to the head. The reservoir is open to atmosphere and it is not practical to implement the first two concepts listed below because there is no way to draw a vacuum on an open system. However, the third concept is possible since it relies on a maintenance cap to provide positive pressure for the de-priming.

A vacuum reservoir embodiment now is described. The preferred embodiment of this invention utilizes a sealed cavity capable of maintaining a vacuum. This could be a molded plastic vessel shaped to fit into a convenient location within the printing system. A vacuum would be maintained within this vessel by using a pump during normal, powered operation. This pump could be an existing pump in the machine or an inexpensive dedicated pump such as a peristaltic pump. A valve, possibly attached to the printhead vent tube, would isolate the vacuum from the printhead reservoir by keeping the valve closed to the vacuum and open to atmosphere while it is continuously energized. Upon loss of power or when the printer controller intentionally removes the control voltage, the valve will open and allow the vacuum to be transmitted to the head while simultaneously blocking the vent tube's path to atmosphere. This will cause the actuators to de-prime thereby preventing damage.

A higher level of safety could be implemented by placing a bi-metallic or other temperature sensitive switch in series with the control voltage for the vacuum valve. When the temperature of the printhead drops to a predetermined temperature, the switch would open and the control voltage would be cut from the valve causing the printhead to de-prime. This would cover the case of a controller malfunction where the controller incorrectly senses that the printhead is at temperature but in fact isn't. An additional benefit of the in-series thermostatic switch would be if one wanted to wait until the moment just before freezing to start the de-prime process. This could be useful since the printhead takes a relatively long period of time to freeze and one may not be able to apply the vacuum for the entire cooling down process due to volumetric limitations of the vacuum chamber.

A vacuum pump with alternative power source embodiment now is described. The de-priming operation can also be accomplished by using a vacuum pump attached to a battery. This might be the already existing pump used to create positive pressure to prime the system, just run in reverse. If a separate pump is used then a valve to shut off the printhead vent to atmosphere is necessary as in the preferred embodiment. The battery could power a controller board that performs a number of different functions. The board could sense the temperature of the printhead, turn on the pump and switch the solenoid valve or any combination of these.

A positive pressure reservoir or pump with alternative power source embodiment now is described. Instead of using vacuum, positive pressure can be used. However, the pressure would need to be applied to the front face of the head. In order to do this a maintenance cap sealed to the front face would be necessary. Current solid ink jet ("SIJ") printers have just such a cap that is used during priming operations. The primary issue with this method is that when there is a power outage or the plug is pulled, it is likely that the printhead will not be docked in its maintenance cap. An alternative power source, such as a battery, would need to supply a controller board, motors, sensors and either the positive pressure solenoid valve or the pump to cause de-prime.

In summary, the above embodiments reduce the effect of volumetric change during the freeze/thaw process and protect MEMS based printheads from damage.

Thus there is described the first aspect of the present invention, namely, a method to deprime a print element 30 in an image forming device 1, the image forming device 1 comprising an ink reservoir 10 that contains a reservoir ink 11, and where the ink reservoir 10 is arranged to provide 21 the reservoir ink to the print element by means of an included ink supply channel 20 such that a print element ink 31 is supplied to the print element 30, the method comprising (a) detecting by any of the detectors 51, 52, 53 a fault condition that is based on a likelihood of a freezing of the print element ink 31 in the print element 30; and (b) when the fault condition is detected, causing the print element ink 31 to evacuate, discharge, withdraw or flow from the print element 30 by means of the ink supply channel 20.

In a variation, substantially as described in claim 2 below, the method includes a detecting by the power loss detector 51 of a loss of power.

In a further variation, substantially as described in claim 3 below, the method includes a detecting by the power down detector 52 of a power-down condition.

In another variation, substantially as described in claim 4 below, the print element 30 includes a print element temperature 33 and the method includes a detecting by the print element temperature detector 53 of the print element temperature 33 being less than or equal to a threshold value.

In a first embodiment of a print element de-prime method, in accordance with the present invention, substantially as described in claim 5 below, the ink reservoir 10 includes a reservoir pressure 12 and the method includes a reducing of the reservoir pressure 12.

In a variation of the first embodiment, substantially as described in claim 6 below, the method includes a coupling by the pressure reducing means valve 5 of the ink reservoir 10 to a provided pressure reducing means 2.

In a further variation, substantially as described in claim 7 below, the pressure reducing means 2 comprises a negative pressure atmosphere source that is maintained in a provided storage means.

In another variation, substantially as described in claim 8 below, the pressure reducing means 2 comprises a provided atmosphere suction or expansion pump.

In a second embodiment of a print element de-prime method, in accordance with the present invention, substantially as described in claim 9 below, the print element 30 includes a print element pressure 32, and the method includes an increasing of the print element pressure 32.

In a variation of the second embodiment, substantially as described in claim 10 below, the method includes a coupling by the pressure increasing means valve 105 of the print element 30 to a provided pressure increasing means 102.

In a further variation, substantially as described in claim 11 below, the print element 30 includes a print element nozzle 39, and the method includes bringing the print element nozzle 39 into contact with a provided maintenance cap 180 and with the maintenance cap 180, in turn, being coupled to the pressure increasing means 102.

In another variation, substantially as described in claim 12 below, the pressure increasing means 102 comprises a positive pressure atmosphere source that is maintained in a provided storage means.

In a further variation, substantially as described in claim 13 below, the pressure increasing means 102 comprises a provided atmosphere blower or compressor pump.

In a third embodiment of a print element de-prime process, in accordance with the present invention, substantially as described in claim 14 below, the ink reservoir 10 includes a reservoir pressure 12 and the print element 30 includes a print element pressure 32, and the method includes reducing the reservoir pressure 12 and increasing the print element pressure 32.

In a variation of the third embodiment, substantially as described in claim 15 below, the method includes a coupling by the pressure reducing means valve 5 of the ink reservoir 10 to a provided pressure reducing means 2 and a coupling by the pressure increasing means valve 105 of the print element 30 to a provided pressure increasing means 102.

In a further variation, substantially as described in claim 16 below, the pressure reducing means 2 comprises a negative pressure atmosphere source that is maintained in a provided storage means.

In another variation, substantially as described in claim 17 below, the pressure reducing means 2 comprises a provided atmosphere suction or expansion pump.

In a further variation, substantially as described in claim 18 below, the print element 30 includes a print element nozzle 39, and the method includes bringing the print element nozzle 39 into contact with a provided maintenance cap 180 and with the maintenance cap 180, in turn, being coupled to the pressure increasing means 102.

In another variation, substantially as described in claim 19 below, the pressure increasing means 102 comprises a positive pressure atmosphere source that is maintained in a provided storage means.

In a further variation, substantially as described in claim 20 below, the pressure increasing means 102 comprises a provided atmosphere blower or compressor pump.

The table below lists the drawing element reference numbers together with their corresponding written description:

No.: Description:
1 image forming device
2 pressure reducing means
3 pressure reducing means channel
5 pressure reducing means valve
7 pressure reducing means reservoir channel
10 ink reservoir
11 reservoir ink as comprised in the ink reservoir 10
12 reservoir pressure as comprised in the ink reservoir 10
20 ink supply channel coupling the ink reservoir 10 and the print element 30
21 ink flow from the reservoir 10 towards the print element 30
29 print element ink 31 evacuating, discharging, withdrawing or flowing from the print element 30
30 print element
31 print element ink as comprised in the print element 30
32 print element pressure as comprised in the print element 30
33 print element temperature as comprised in the print element 30
34 print element temperature signal
39 print element nozzle
40 printhead comprising the ink reservoir 10, the ink supply channel 20 and the print element 30
51 power loss detector
52 power down detector
53 print element temperature detector
61 power loss detector output
62 power down detector output
63 print element temperature detector output
90 control means
91 control means pressure reducing means valve output
92 control means pressure increasing means valve output
102 pressure increasing means
103 pressure increasing means channel
105 pressure increasing means valve
107 pressure increasing means print element channel
180 maintenance cap While particular embodiments have been described hereinabove, alternatives, modifications, variations, improvements and substantial equivalents that are or may be presently unforeseen may arise to applicants or others skilled in the art. Accordingly, the appended claims as filed and as they may be amended are intended to embrace all such alternatives, modifications, variations, improvements and substantial equivalents.

What is claimed is:

1. A method to deprime a print element in an image forming device, the image forming device comprising an ink reservoir that contains a reservoir ink, and where the ink reservoir is arranged to provide the reservoir ink to the print element by means of an included ink supply channel such that a print element ink is supplied to the print element, the method comprising:

(a) detecting a fault condition that is based on a likelihood of a freezing of the print element ink; and (b) when the fault condition is detected, causing the print element ink to flow from the print element by means of the ink supply channel.

2. The method of claim 1 including a detecting of a loss of power.

3. The method of claim 1 including a detecting of a power-down condition.

4. The method of claim 1, the print element including a print element temperature and including a detecting of the print element temperature being less than or equal to a threshold value.

5. The method of claim 1, the ink reservoir including a reservoir pressure, and where the method includes reducing the reservoir pressure.

6. The method of claim 5 including coupling the ink reservoir to a provided pressure reducing means.

7. The method of claim 6 where the pressure reducing means comprises a negative pressure atmosphere source that is maintained in a provided storage means.

8. The method of claim 6 where the pressure reducing means comprises a provided atmosphere suction or expansion pump.

9. The method of claim 1, the print element including a print element pressure, and where the method includes increasing the print element pressure.

10. The method of claim 9 including coupling the print element to a provided pressure increasing means.

11. The method of claim 10, the print element including a print element nozzle, and where the method includes bringing the print element nozzle into contact with a provided maintenance cap and with the maintenance cap, in turn, being coupled to the pressure increasing means.

12. The method of claim 10 where the pressure increasing means comprises a positive pressure atmosphere source that is maintained in a provided storage means.

13. The method of claim 10 where the pressure increasing means comprises a provided atmosphere blower or compressor pump.

14. The method of claim 1, the ink reservoir including a reservoir pressure and the print element including a print element pressure, and where the method includes reducing the reservoir pressure and increasing the print element pressure.

15. The method of claim 14 including coupling the ink reservoir to a provided pressure reducing means and coupling the print element to a provided pressure increasing means.

16. The method of claim 15 where the pressure reducing means comprises a negative pressure atmosphere source that is maintained in a provided storage means.

17. The method of claim 15 where the pressure reducing means comprises a provided atmosphere suction or expansion pump.

18. The method of claim 15, the print element including a print element nozzle, and where the method includes bringing the print element nozzle into contact with a provided maintenance cap and with the maintenance cap, in turn, being coupled to the pressure increasing means.

19. The method of claim 15 where the pressure increasing means comprises a positive pressure atmosphere source that is maintained in a provided storage means.

20. The method of claim 15 where the pressure increasing means comprises a provided atmosphere blower or compressor pump.

* * * * *